United States Patent
Zheng et al.

(10) Patent No.: US 11,422,999 B2
(45) Date of Patent: Aug. 23, 2022

(54) SYSTEM AND METHOD FOR USING DATA WITH OPERATION CONTEXT

(71) Applicant: SCHLUMBERGER TECHNOLOGY CORPORATION, Sugar Land, TX (US)

(72) Inventors: Shunfeng Zheng, Katy, TX (US); Benjamin Peter Jeffryes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 23 days.

(21) Appl. No.: 15/651,776

(22) Filed: Jul. 17, 2017

(65) Prior Publication Data
US 2019/0018871 A1   Jan. 17, 2019

(51) Int. Cl.
G06F 16/22        (2019.01)
G06F 16/2455   (2019.01)
G06F 16/2458   (2019.01)
G06F 11/30        (2006.01)

(52) U.S. Cl.
CPC .......... G06F 16/2272 (2019.01); G06F 11/30 (2013.01); G06F 16/2455 (2019.01); G06F 16/2465 (2019.01)

(58) Field of Classification Search
CPC ............. G06F 16/2455; G06F 16/2272; G06F 16/2465; G06F 11/30
USPC ......................................................... 707/741
See application file for complete search history.

(56) References Cited

U.S. PATENT DOCUMENTS

| 4,794,534 A | 12/1988 | Millheim |
| 4,875,530 A | 10/1989 | Frink et al. |
| 5,467,832 A | 11/1995 | Orban et al. |
| 5,590,958 A | 1/1997 | Dearing, Sr. et al. |
| 5,842,149 A | 11/1998 | Harrell et al. |
| 5,959,547 A | 9/1999 | Tubel et al. |
| 6,029,951 A | 2/2000 | Guggari |

(Continued)

FOREIGN PATENT DOCUMENTS

| WO | 2004059123 A1 | 7/2004 |
| WO | 2016102381 A1 | 6/2016 |

(Continued)

OTHER PUBLICATIONS

Zheng et al., U.S. Appl. No. 15/361,759, filed Nov. 28, 2016; "Well Construction Communication and Control"; 52 pages.

(Continued)

*Primary Examiner* — Hosain T Alam
*Assistant Examiner* — Robert F May
(74) *Attorney, Agent, or Firm* — Alec J. McGinn

(57) ABSTRACT

A method includes creating a digital description of the well construction system, wherein the digital description of the well construction system describes the locational relationship of components in the well construction system, collecting multiple types of data from a well construction system, and tagging the collected data with an identification indicating at least one of a location of a source of collected data and a component in the well construction system from which the data is collected. The multiple types of data include sensor data collected from one or more sensors disposed along the well construction system and operational state data indicating an on/off status of one or more components in the well construction system.

20 Claims, 5 Drawing Sheets

(56) References Cited

U.S. PATENT DOCUMENTS

| | | | |
|---|---|---|---|
| 6,050,348 A | 4/2000 | Richarson et al. |
| 6,186,248 B1 | 2/2001 | Silay et al. |
| 6,338,390 B1 | 1/2002 | Tibbitts |
| 6,374,925 B1 | 4/2002 | Elkins et al. |
| 6,382,331 B1 | 5/2002 | Pinckard |
| 6,484,816 B1 | 11/2002 | Koederitz |
| 6,626,238 B2 | 9/2003 | Hooper |
| 6,662,110 B1 | 12/2003 | Bargach et al. |
| 6,732,052 B2 | 5/2004 | Macdonald et al. |
| 6,803,760 B2 | 10/2004 | Jones et al. |
| 6,892,812 B2 | 5/2005 | Niedermayr et al. |
| 6,896,055 B2 | 5/2005 | Koithan |
| 6,925,807 B2 | 8/2005 | Jones et al. |
| 6,931,621 B2 | 8/2005 | Green et al. |
| 6,994,172 B2 | 2/2006 | Ray |
| 7,038,965 B2 | 5/2006 | Shih |
| 7,044,237 B2 | 5/2006 | Leuchtenberg |
| 7,054,750 B2 | 5/2006 | Rodney et al. |
| 7,059,427 B2 | 6/2006 | Power et al. |
| 7,100,708 B2 | 9/2006 | Koederitz |
| 7,114,577 B2 | 10/2006 | Newman |
| 7,138,925 B2 | 11/2006 | Nield |
| 7,152,696 B2 | 12/2006 | Jones |
| 7,172,037 B2 | 2/2007 | Dashevskiy et al. |
| 7,243,735 B2 | 7/2007 | Koederitz et al. |
| 7,264,050 B2 | 9/2007 | Koithan et al. |
| 7,278,496 B2 | 10/2007 | Leuchtenberg |
| 7,306,054 B2 | 12/2007 | Hutchinson |
| 7,357,196 B2 | 4/2008 | Goldman et al. |
| 7,367,411 B2 | 5/2008 | Leuchtenberg |
| 7,404,454 B2 | 7/2008 | Hulick |
| 7,461,705 B2 | 12/2008 | Hulick et al. |
| 7,588,100 B2 | 9/2009 | Hamilton |
| 7,591,304 B2 | 9/2009 | Juhasz et al. |
| 7,672,262 B2 | 3/2010 | McCoy et al. |
| 7,823,655 B2 | 11/2010 | Boone et al. |
| 7,860,593 B2 | 12/2010 | Boone |
| 7,874,351 B2 | 1/2011 | Hampton et al. |
| 7,895,220 B2 | 2/2011 | Evans et al. |
| 7,896,084 B2 | 3/2011 | Haugen |
| 7,938,197 B2 | 5/2011 | Boone et al. |
| 7,945,488 B2 | 5/2011 | Karr et al. |
| 8,042,623 B2 | 10/2011 | Quernheim et al. |
| 8,103,493 B2 | 1/2012 | Sagert et al. |
| 8,121,971 B2 | 2/2012 | Edwards et al. |
| 8,131,510 B2 | 3/2012 | Wingky et al. |
| 8,145,464 B2 | 3/2012 | Arnegaard et al. |
| 8,154,419 B2 | 4/2012 | Daussin et al. |
| 8,210,283 B1 | 7/2012 | Benson et al. |
| 8,215,417 B2 | 7/2012 | Annaiyappa et al. |
| 8,286,730 B2 | 10/2012 | Pool et al. |
| 8,301,386 B1 | 10/2012 | Redmond et al. |
| 8,347,957 B2 | 1/2013 | Stephenson et al. |
| 8,360,171 B2 | 1/2013 | Boone et al. |
| 8,381,838 B2 | 2/2013 | Hutniak et al. |
| 8,386,059 B2 | 2/2013 | Boone |
| 8,387,720 B1 | 3/2013 | Keast et al. |
| 8,417,456 B2 | 4/2013 | Mauldin et al. |
| 8,590,635 B2 | 11/2013 | Koederitz |
| 8,602,126 B2 | 12/2013 | Boone et al. |
| 8,616,274 B2 | 12/2013 | Belcher et al. |
| 8,718,802 B2 | 5/2014 | Boone |
| 8,794,353 B2 | 8/2014 | Benson et al. |
| 8,818,779 B2 | 8/2014 | Sadlier et al. |
| 8,939,234 B2 | 1/2015 | Mebane, III et al. |
| 9,027,671 B2 | 5/2015 | Koederitz |
| 9,062,524 B2 | 6/2015 | Calvo et al. |
| 9,157,309 B1 | 10/2015 | Benson et al. |
| 9,175,557 B2 | 11/2015 | Iversen et al. |
| 9,223,594 B2 | 12/2015 | Brown et al. |
| 9,249,654 B2 | 2/2016 | Strachan et al. |
| 9,285,794 B2 | 3/2016 | Wang et al. |
| 9,290,995 B2 | 3/2016 | Boone et al. |
| 9,322,247 B2 | 4/2016 | Rojas et al. |
| 9,359,881 B2 | 6/2016 | DiSantis |
| 9,388,681 B2 | 7/2016 | Dykstra et al. |
| 9,410,417 B2 | 8/2016 | Reckmann et al. |
| 9,410,418 B2 | 8/2016 | Papouras et al. |
| 9,436,173 B2 | 9/2016 | Wang et al. |
| 9,441,428 B1 | 9/2016 | Barnes et al. |
| 9,464,517 B2 | 10/2016 | Papouras et al. |
| 9,482,083 B2 | 11/2016 | Doris |
| 9,506,336 B2 | 11/2016 | Orbell |
| 9,528,334 B2 | 12/2016 | Davis et al. |
| 9,593,566 B2 | 3/2017 | Hoehn et al. |
| 9,593,567 B2 | 3/2017 | Pink et al. |
| 9,598,947 B2 | 3/2017 | Wang et al. |
| 2003/0212898 A1 | 11/2003 | Steele et al. |
| 2007/0062692 A1* | 3/2007 | Estevez ............... H04L 67/12 166/250.01 |
| 2010/0104401 A1 | 4/2010 | Hopkins et al. |
| 2010/0121861 A1 | 5/2010 | Marsden et al. |
| 2012/0026002 A1* | 2/2012 | Vu ............ E21B 47/00 340/854.6 |
| 2012/0203507 A1 | 8/2012 | Thomeer et al. |
| 2014/0151121 A1 | 6/2014 | Boone et al. |
| 2014/0246238 A1 | 9/2014 | Abbassian et al. |
| 2014/0299378 A1 | 10/2014 | Abbassian et al. |
| 2015/0015412 A1 | 1/2015 | Abbassian et al. |
| 2015/0105912 A1 | 4/2015 | Dykstra |
| 2015/0241871 A1 | 8/2015 | Yoshino et al. |
| 2015/0252664 A1 | 9/2015 | Astrid et al. |
| 2015/0345262 A1 | 12/2015 | Kpetehoto et al. |
| 2015/0345281 A1* | 12/2015 | Cardellini ............ E21B 47/007 340/853.2 |
| 2015/0369030 A1 | 12/2015 | Hay et al. |
| 2016/0024906 A1 | 1/2016 | Jamison et al. |
| 2016/0034818 A1* | 2/2016 | Knecht .................. E21B 47/00 166/308.1 |
| 2016/0047220 A1 | 2/2016 | Sharp et al. |
| 2016/0053604 A1* | 2/2016 | Abbassian ............... E21B 45/00 702/6 |
| 2016/0076354 A1 | 3/2016 | Lai et al. |
| 2016/0130917 A1 | 5/2016 | Torrione |
| 2016/0160627 A1 | 6/2016 | Aitken |
| 2016/0168973 A1 | 6/2016 | Dykstra et al. |
| 2016/0194950 A1 | 7/2016 | Zheng et al. |
| 2016/0222775 A1 | 8/2016 | Tunc et al. |
| 2016/0230530 A1 | 8/2016 | Dykstra et al. |
| 2016/0237802 A1 | 8/2016 | Boone et al. |
| 2016/0275133 A1 | 9/2016 | Moore |
| 2016/0290046 A1 | 10/2016 | Orban et al. |
| 2016/0290073 A1 | 10/2016 | Zheng et al. |
| 2016/0290119 A1 | 10/2016 | Tunc et al. |
| 2016/0290120 A1 | 10/2016 | Zheng et al. |
| 2016/0291201 A1 | 10/2016 | Tunc et al. |
| 2016/0292933 A1* | 10/2016 | Sprock ................. G06Q 50/08 |
| 2016/0321330 A1 | 11/2016 | Ziegler et al. |
| 2016/0333673 A1 | 11/2016 | Anno et al. |
| 2016/0356125 A1* | 12/2016 | Bello ................... E21B 43/14 |
| 2016/0369619 A1 | 12/2016 | Parmeshwar et al. |
| 2017/0114632 A1 | 4/2017 | Orban et al. |
| 2017/0122092 A1 | 5/2017 | Harmer |
| 2017/0147963 A1* | 5/2017 | Altamirano ...... G06K 19/07758 |
| 2017/0159372 A1 | 6/2017 | Zheng et al. |
| 2017/0167200 A1 | 6/2017 | Zheng et al. |
| 2017/0167853 A1 | 6/2017 | Zheng et al. |

FOREIGN PATENT DOCUMENTS

| | | | |
|---|---|---|---|
| WO | 2016172038 A1 | 10/2016 |
| WO | 2017132297 A2 | 8/2017 |

OTHER PUBLICATIONS

Zheng et al., International Patent Application No. PCT/US2017/034098 filed May 24, 2017; "Image Based System for Drilling Operations"; 27 pages.

Zheng et al., U.S. Appl. No. 15/379,733, filed Dec. 15, 2016; "Relationship Tagging of Data in Well Construction"; 41 pages.

Zheng et al., International Patent Application No. PCT/US2017/038628 filed Jun. 22, 2017; "System and Method Triangulation and

(56) References Cited

OTHER PUBLICATIONS

Zone Management for Drilling Rig Communication Coordination"; 34 pages.

Stockhausen et al., "Continuous Direction and Inclination Measurements Lead to an Improvement in Wellbore Positioning", SPE/IADC 79917, SPE/IADC Drilling Conference, Feb. 2003, 16 pages.

Genevois et al., "Gyrostab Project: The Missing Link—Azimuth and inclination mastered with new principles for standard roatry BHAs", SPE/IADC 79915, SPE/IADC Drilling Conference, Feb. 2003, 11 pages.

Aguiar et al., "On the Benefits of Automation in Improving the Drilling Efficiency in Offshore Activities", IADC/SPE 168025, 2014 IADC/SPE Drilling Conference and Exhibition, Mar. 2014, 12 pages.

Brett et al., "Field Experiences With Computer-Controlled Drilling", SPE 20107, 1990 Permian Basin Oil and Gas Recovery Conference, Mar. 1990, pp. 197-212.

Halsey et al., "Torque Feedback Used to Cure Slip-Stick Motion", SPE 18049, 63rd Annual Technical Conference and Exhibition of the Petroleum Engineers, Oct. 1988, pp. 277-282.

Jones et al., "Stick-Slip and Torsional Oscillation Control in Challenging Formation—A New Solution to an Old Problem", AADE-17-NTCE-076, 2017 AADE National Technical Conference and Exhibition, Apr. 2017, 10 pages.

\* cited by examiner

SYSTEM AND METHOD FOR USING DATA WITH OPERATION CONTEXT

BACKGROUND

Well construction operation usually involves many people and equipment. These people operate various equipment or subsystems to accomplish a common well construction goal. For example, a drilling rig may be provided at the wellsite. The drilling rig typically includes a drawwork, a top drive, iron roughneck, and mud pumps, etc. A fluid system may also be provided at the wellsite. The fluid system may include an active tank system, a bulk material handling system, a solid control system etc.

For a given operation, such as drilling a section, multiple operators and equipment are working in parallel to accomplish the goal. A driller may control the hoisting and or rotary system, while a mud engineer may be adjusting the fluid properties. In order to accomplish a situational awareness of the drilling operation, many sensors may be installed on various equipment to detect process parameters, such as pressure, force, temperature, density, etc. These parameters have been used to estimate and/or infer the state of a drilling operation. Detected parameters have also been used as an input for data analytics to understand selected portions of an operation, such as drilling performance, equipment performance, etc. For example, a selected number and/or type of sensors may be used to measure properties of a certain process, for example, to determine parameters of standpipe pressure, pump flow rate, or hookload, or one or more sensors may be used to provide data for analyzing the state of an equipment unit.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to methods that include creating a digital description of the well construction system, wherein the digital description of the well construction system describes the locational relationship of components in the well construction system, collecting multiple types of data from a well construction system, the multiple types of data including sensor data collected from one or more sensors disposed along the well construction system and operational state data indicating an on/off status of one or more components in the well construction system, and tagging the collected data with an identification indicating at least one of a location of a source of collected data and a component in the well construction system from which the data is collected.

In another aspect, embodiments of the present disclosure relate to a method of evaluating a well construction system that includes constructing a digital description of the well construction system, the digital description comprising a list of components in the well construction system and a plurality of locational relationships between components in the well construction system, collecting multiple types of data from the well construction system, the collecting including automatically collecting data through instrumentation and manually inputting data, and determining an operational state of at least one component in the well construction system based on the collected data.

In another aspect, embodiments of the present disclosure relate to collecting into a database sensor data from one or more sensors disposed along a well construction system, inputting into the database non-sensor data, the non-sensor data comprising at least one of operational state data indicating an on/off status of one or more components in the well construction system, operator commands, observational inputs, and interactions between personnel and the well construction system, tagging the sensor data and the non-sensor data with an identification indicating a component in the well construction system from which the data is collected, and comparing sensor data identified from a selected component in the well construction system with non-sensor data identified from the selected component to determine an operational state of the selected component.

In yet another aspect, embodiments of the present disclosure relate to a system that includes a well construction system, a digital description of the well construction system, the digital description comprising a list of components in the well construction system and a plurality of locational relationships between components in the well construction system, a database including sensor data collected from a plurality of sensor disposed in the well construction system, and non-sensor data selected from at least one of operational state data indicating an on/off status of one or more of the components in the well construction system, operator commands, observational inputs, and interactions between personnel and the well construction system.

Other aspects and advantages of the invention will be apparent from the following description and the appended claims.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Embodiments disclosed herein include methods and systems of collecting data from a well construction system for use in estimating the overall condition or state of the well construction system. As used herein, the state of a well construction system includes both the drilling state and the equipment state. Equipment state may include, for example, operational state such as if the equipment is on/off, if the equipment is restarted, the equipment running hour, and maintenance data. A well construction system may include a rig and auxiliary equipment used with the rig for drilling a well. In some embodiments, a well construction system may include equipment used together for hydraulic fracturing of a well. Well construction systems may include various equipment arrangements for drilling, constructing, and/or maintaining wells.

Figure 1:
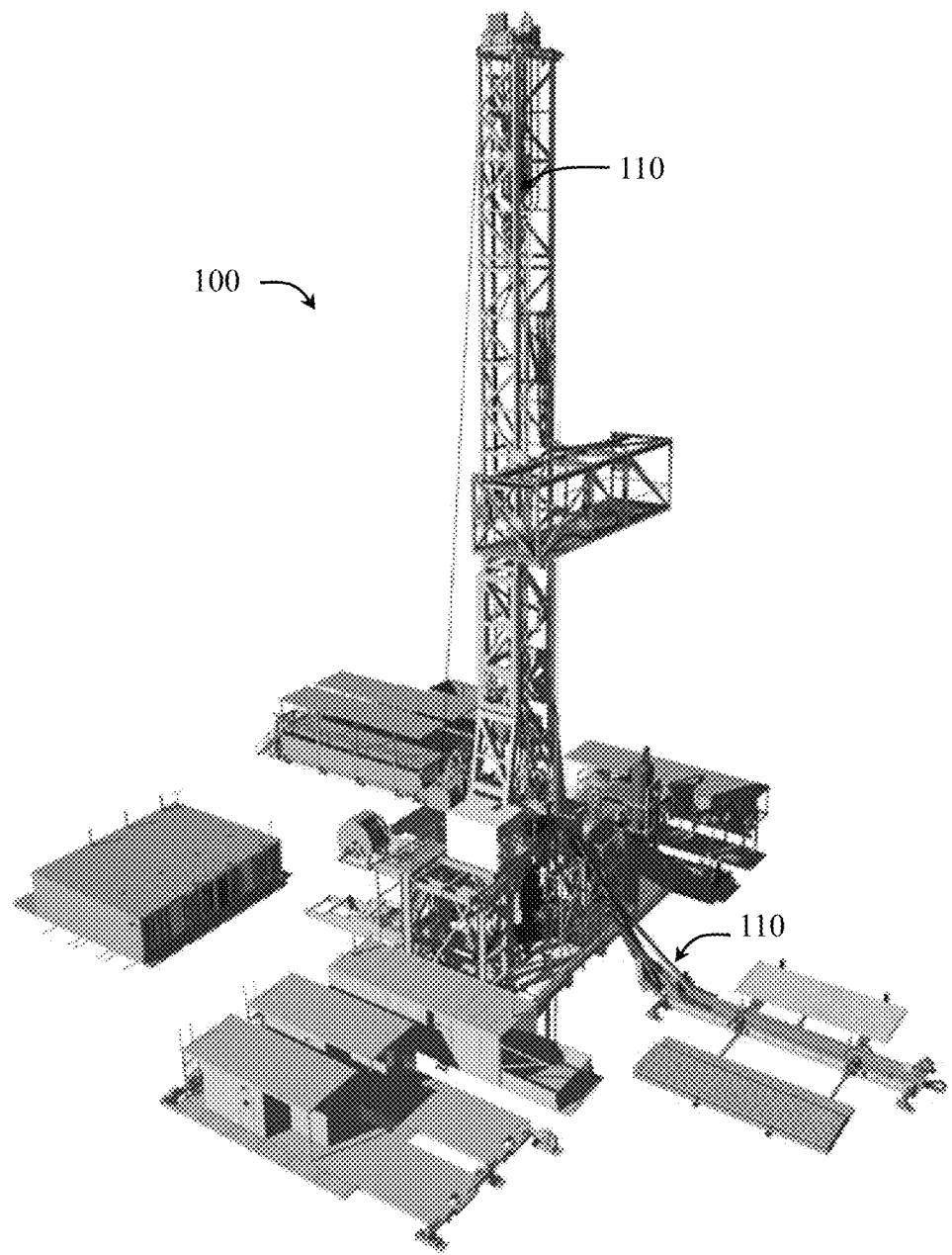
FIG. 1 shows an example of a well construction system.

For example, FIG. 1 shows an example of a well construction system 100 that is a rig for drilling a well. The rig includes multiple components 110 assembled together, which together may work to drill the well and perform auxiliary functions for maintaining rig performance. Components used in the rig may be equipment units and/or may be assembled together to form equipment units and/or subsystems of the well construction system. For example, components in a rig may include one or more of a mud tank, a shale shaker, a suction line, a mud pump, a motor, power source(s), a vibrating hose, draw-works, a standpipe, a swivel, a rotary table, a Kelly hose, and a Kelly drive, or a top drive, a Goose-neck, a traveling block, a drill line, a crown block, a derrick, a stand of drill pipe, pipe rack, a drill floor, a bell nipple, a blowout preventer ("BOP"), drill string, a bottom hole assembly (including a drill bit) at an end of the drill string, casing head, flow line(s), diverter(s), valves and others. Different rig assemblies may use different components for rotating drill pipe, different motor types and/or different power sources, for example, to power different subsystems.

The rig assembly may be used to drill a well, where components in the rig assembly may rotate and descend a drill bit into a formation by extending the drill string on which the drill bit is attached into the formation. Drilling fluid may be sent through the drill string and drill bit to the bottom of the hole being drilled, which may aid in drilling the formation. Fluid from the bottom hole may be returned through an annulus between the well and the drill string, through a diverter, and through a return flow line. Fluid returning from one or more return flow lines may be filtered, e.g., through one or more shakers to filter cuttings out of the fluid, and collected, e.g., in one or more mud tanks.

Further, components used in the well construction system 100 may include a plurality of sensors, which may be used to detect or monitor selected parameters of the rig. For example, different types of sensors may be disposed along one or more components of the rig assembly to monitor different types of parameters in the rig (e.g., fluid flow rate through one or more pipes in the rig assembly, temperature of one or more components in the rig assembly, or a position of one or more components in the rig assembly).

Another example of a well construction system may be a hydraulic fracturing system, which may include one or more wells capped with a frac tree following completions that provides a connection to fracturing equipment used to deliver treatments at high pressures to induce formation fractures for enhanced hydrocarbon recovery. Another component in a hydraulic fracturing system may include a frac manifold placed in close proximity to the wells being serviced. A hydraulic fracturing system may further include high-pressure frac fluid routed from nearby frac trucks through a frac pump output header, or missile, and to the frac manifold. Supply lines of the frac manifold may terminate in an outlet head (often referred to as a goat head or frac head in the industry) that connects to valve fittings at the top of a frac tree for each well. Outlet heads may be designed to ensure efficient and safe hydraulic fracturing fluid flow when pumping high volumes at extreme pressures during the fracturing.

Frac manifolds may isolate wells that have completed a frac cycle and for which interventions, such as plug and perforation operations, are to be conducted, and may redirect fluid flow to a well prepared for the next frac cycle. Frac manifolds may allow sequential downhole operations using actuated valves, reducing the safety risks and improving the transition speeds without the need for manual adjustments. The use of a frac manifold in this manner is called "zipper" or "zip" fracturing, and may provide almost continuous utilization of the frac crew and equipment, from the first treatment at the toe of the first well to the last treatment at the heel of the last well. Accordingly, a frac manifold used in this manner may also be referred to as a zipper manifold. Typical components of a zipper manifold may include spools, tees, crosses, gate valves, and outlet heads. Zipper manifolds may have a number of configurations to suit the number and spacing of wells being serviced, the planned arrangement of the frac lines, the extent to which actuation is desired, and the like.

Embodiments of the present disclosure may include other well construction systems used for drilling, servicing, and/or maintaining a well operation, which may include components known in the oil and gas industry.

According to embodiments of the present disclosure, the state of a well construction system, the state of components of the well construction system and/or well construction performance evaluation may be performed by 1) constructing a digital description of the well construction system, 2) collecting well construction data, and 3) analyzing the collected data in its operational context.

Constructing a Digital Description

A digital description of a well construction system may include a list of components in the well construction system and a description of the relationships (e.g., hierarchal, logical and locational relationships) between the components in the well construction system. The digital description of a well construction system may be provided in a coded format, which may stored in a computing device, for example, or may be stored in a database, a storage medium, or in a network, such as described in more detail with respect to FIGS. 5 and 6. A digital description may be designed to show a selected level of detail. For example, the digital description of a rig well construction system may include a description of relationships between components forming a hoisting subsystem and a description of relationships between components forming a circulating subsystem. Within the digital description, the components listed for forming the hoisting subsystem may include an elevator and a top drive to provide detail at a component level of the well construction system. In some embodiments, a digital description may include description of size, color, and/or shape of components in a well construction system to provide a greater level of detail.

In some embodiments, a schematic of a well construction system may be generated from the digital description of the well construction system, such as shown in FIG. 1. The digital description of the well construction system 100 shown in FIG. 1 may include a rig power subsystem, a hoisting subsystem, a circulating subsystem, and a rotary subsystem, where each of these functional subsystems may be made of a number of components that work together to deliver the given functions of the subsystem.

According to embodiments of the present disclosure, a digital description of a well construction system may be created, where the digital description may fully describe the composition of the whole well construction system (e.g., rig system), including the physical and logical composition of each subsystem, how components in each subsystem are related to each other, and how each subsystem is interacted with each other. For example, the digital description of a rig system may include the physical layout of the rig system, including drawwork, drilling line, crown block, traveling block, top drive, drilling line anchor, rotary table, mud pumps, pulsation damper, pipe and connectors that transfer fluid from mud tank, pumps, into the drill pipe, as well as the return flow to the reserve tanks.

The digital description of a well construction system may also include the placement of sensors. For example, a well construction system may include a pressure sensor may be placed at the outlet of a mud pump, or at a rig manifold; an encoder may be placed at a driveshaft of a mud pump motor, at the rotating axis of a drawwork, or at the rotating shaft of a top drive motor; a force transducer may be placed at a deadline anchor, above the top drive, or between the top drive and the drill pipe; a current or a voltage sensor may be used to measure the current and voltage that go through the mud pump, drawwork, top drive, etc. The locations of these sensors and their measurement properties may be included in the digital description of the well construction system.

A stored digital description (e.g., in a computing device or over a network) of a well construction system may be accessed, for example, to map collected data to a location in the well construction system. Collected data may be mapped to a location in the digital description of the well construction system, for example, by matching a source of the collected data, such as a sensor, with the location of the source in the digital description of the well construction system. In some embodiments, a stored digital description of a well construction system may be accessed to generate a schematic representation of the well construction system, such as shown in FIG. 1.

Collecting Well Construction Data

According to embodiments of the present disclosure, data may be collected from areas throughout a well construction system, e.g., at the subsystem level and/or from individual components in the well construction system, such that the entire well construction system may be characterized from the collected data, and/or selected subsystems or components in the well construction system may be analyzed from the collected data. Methods of the present disclosure that include collecting data from throughout a well construction system may be used for improved rig state estimation (or other well construction system state estimation), equipment health monitoring, and data analytics for drilling and equipment performance.

Further, methods of the present disclosure may include collecting multiple types of data from a well construction system. Different types of data may include sensor and non-sensor data, and/or may include data collected from different types of sources, such as from different types of sensors, from video, from cameras, from personnel manually inputting data, and/or from automatic data input (e.g., computer inputted commands to control one or more components may be automatically collected). Sensor data may be used to refer to data collected from one or more sensors disposed along a well construction system. Non-sensor data may be used to refer to data collected from ways other than through sensors. For example, non-sensor data may include data collected manually by personnel operating or servicing one or more components in the well construction system. According to embodiments of the present disclosure, non-sensor data may include, for example, at least one of operational state data (e.g., data indicating an on/off status of one or more components in the well construction system), operator commands, observational inputs, and interactions between personnel and the well construction system. Different types of collected data are discussed in more detail below.

As provided above, sensor data may be collected from different types of sensor sources, including sensors from surface and downhole. Different sensor types for downhole measurements may include, for example, sensors for sensing formation pressure, formation temperature, formation porosity, formation permeability and formation bulk resistivity, among other properties, which may enable characterization and quantification of the characteristics and properties of the well-bore and its surrounding subsurface formations. Sensors known in the art that may be used in well construction systems for sensor data collection may include but are not limited to resistivity sensors, sonic sensors, neutron sensors, motion sensors, gamma ray sensors, high resolution current injection sensors, temperature sensors, pressure sensors, flow rate sensors, conductivity sensors, and chemical sensors to measure a particular chemical element or compound (e.g., carbon dioxide sensors, sulfur dioxide sensors), for example. Different sensor types for surface measurements may include sensors to measure pressure, force, position, current, voltage, temperature, rotation, flow rate, etc. In some embodiments, operating condition sensors (such as a position sensor) may be provided along one or more valves (e.g., motor operated valves) to sense the operating condition of the valve, e.g., whether the valve is open or closed, and if open, to what extent the valve is open.

Sensor data may be collected via electrical signals transmitted from the sensor through a data transmission system to a computing device, a database, a data bus, or a network. A data transmission system may include wires in communication between sensor(s) and a computing device and/or may include wireless transmission of signals from sensor(s) to a remote receiver.

According to embodiments of the present disclosure, sensor data may include data collected from one or more sensors related to an operation process, such as standpipe pressure, flow rate, hookload, block position, and others. Sensor data may further include data collected from one or more sensors related to a condition of one or more components in a well construction system. For example, temperature sensors may be used to monitor or detect the temperature along an equipment unit, where the sensor data from the temperature sensors may be transmitted and collected, and which may be used for condition analysis of the equipment unit.

Another type of collected data may include non-sensor data collected from operator commands, for example, an operator command to set a selected RPM (revolution per minute) set point (e.g., set point for rotational speed of drill pipe or rotational speed of a motor), an operator command to set a selected weight-on-bit (WOB) set point, an operator command to set a pump flow rate (e.g., through stroke count), or other operator commands to control an equipment unit. Data collected from operator commands may be captured through an automated control system (e.g., a computer-inputted command to control one or more components may be transmitted and stored in a database storing collected data), or through manual input (e.g., an operator may manually input a command made to a well construction system into a database storing collected data).

Collected data may also include data related to personnel interaction with the well construction system. Data collected from personnel interaction with a well construction system may include different types of information about what personnel do to the well construction system, such as material preparation (e.g., adding a selected amount of barite into a circulating subsystem of the well construction system or preparing a number of barrels of lost circulation material) and maintenance information (e.g., changing a shaker screen, replacing a mud pump liner, etc.). Data collected from personnel interaction with a well construction system may be captured through an active sensing system (e.g., with one or more sensors, through video, etc.), or through manual input (non-sensor data). For example, non-sensor data collected from interactions between personnel and a well construction system may include, for example, manual input of a description of measurements taken and/or servicing performed such as replacing a component, etc.

Another type of collected data may include observational inputs, which includes information describing what personnel observe about a well construction system. For example, observational inputs may include data inputted describing observation of the operational state of an equipment unit (e.g., if a mud pump breaks down, if operation delay is due to a particular reason) or data inputted describing one or more conditions of a component (e.g., if a pipe fitting is leaking). Further, observational inputs may be captured through personnel description of their visual observation, or through a camera or video.

Another type of collected data may include data corresponding to the operating state of an equipment unit, which may be collected from one or more sensors (sensor data) and/or without the use of a sensor (non-sensor data). For example, data associated with equipment and its operating state may be captured through a direct sensor measurement, such as a valve position sensor, or through indirect measurement, such as current to a mud pump. Data associated with equipment and its operating state may also be captured through manual input of an observation, such as noting an equipment unit out of service. Equipment operating state data may include, for example, data indicating if the equipment is on, off, open, closed, and maintenance information (e.g., if the equipment is undergoing maintenance, the last date/time the equipment was maintained, the type of maintenance conducted, if a component was replaced, and other maintenance data).

Collected data may also include data that relates to general monitoring. For example, as mentioned above, collected data may come from video. Collected data may also come from audio devices and/or vibration sensors (attached to a structure of a well construction system), which may be recorded and archived along appropriate time-stamps. Video, audio and vibrational data can be processed using predetermined algorithms to generate certain state variables, for example, the number and location of people in an office or on a rig floor. According to some embodiments, a computer program executing a video analyzing algorithm may be used to detect and identify changes in collected video data, where the operational state of the at least one component may be determined based on the identified changes in the video.

Additionally, in combination with other data, learning algorithms can associate particular sensor behavior with different rig activities. Once the association has been learnt, the learnt association may allow additional redundancy to compensate if more specific sensors fail, and/or to detect sensor failures. For example, when a top drive rotation generates a vibration signal at the rotation speed of the top drive motor under normal operating conditions, if the top drive is operational but there is no vibration signal at the right frequency, a failure in the top drive rotation speed sensor may be indicated.

Collected data may be acquired automatically and/or manually. Manually collected data may be collected from manual inputs (e.g., from an operator and/or other personnel) of data into a computing device, and may include, for example, data describing observations of the well construction system and/or interactions with the well construction system entered by the personnel making the observation or interaction. For example, a person may manually input observed data through a computing device and include location information (e.g., referencing one or more components listed in the digital description of the well construction system) associated with the inputted data. Automatically collected data may be captured through instrumentation (e.g., sensors, cameras, video, etc.), where location information may be automatically tagged to associate the collected data with the corresponding location in the digital description of the well construction system. Automatically collected and manually collected data may be captured with a proper timestamp (e.g., corresponding to a master clock) indicating the time of data capture.

As data (non-sensor data and sensor data) is collected, the data may be time stamped from a single time reference, which may be referred to as a master clock reference. According to embodiments of the present disclosure, a well construction system may include a single time reference, which may be used to tag data collected throughout the entire well construction system. In this manner, multiple types of data collected from through the well construction system may be synchronized with a single master clock reference, which may then be used for the time stamping of the data as it is collected.

Further, methods of the present disclosure may include tagging collected data with an identification indicating at least one of a location of a source of collected data and a component in the well construction system from which the data is collected. The location may be a physical location indicating the relative position to a component of the well construction system (e.g. the location of a pressure sensor which is on top of the stand pipe), or may be a logical location indication the logical relationship with relation to a component of the well construction system (e.g., a pressure sensor which is located between the mud pump outlet and the standpipe). The location is reflected in the digital description of the well constriction system. For example, a location of a source of collected data may be defined in terms of its relationship to one or more components of the well construction system, e.g., a location of collected flow rate data from a sensor may be referenced in terms of the pipe on which the flow rate sensor is disposed. In some embodiments, sensor data may be acquired through an Electronic Data Recorder (EDR), where location information in reference to the well construction system and a timestamp may be captured as meta data associated with the sensor data. Using the location information and the digital description of the well construction system, the exact location of the placement of the sensors on the well construction system may be identified.

In some embodiments, collected data may be transmitted to a well construction database for use by another application. In some embodiments, through a communication middleware, collected data may be published to a data bus, which may be received by any applications on the same data bus. As described more below, applications that may receive the collected data may include, for example, a well construction state estimation application, an equipment performance evaluation application, a drilling performance evaluation application, a process improvement application, and a well construction database.

Figure 2:
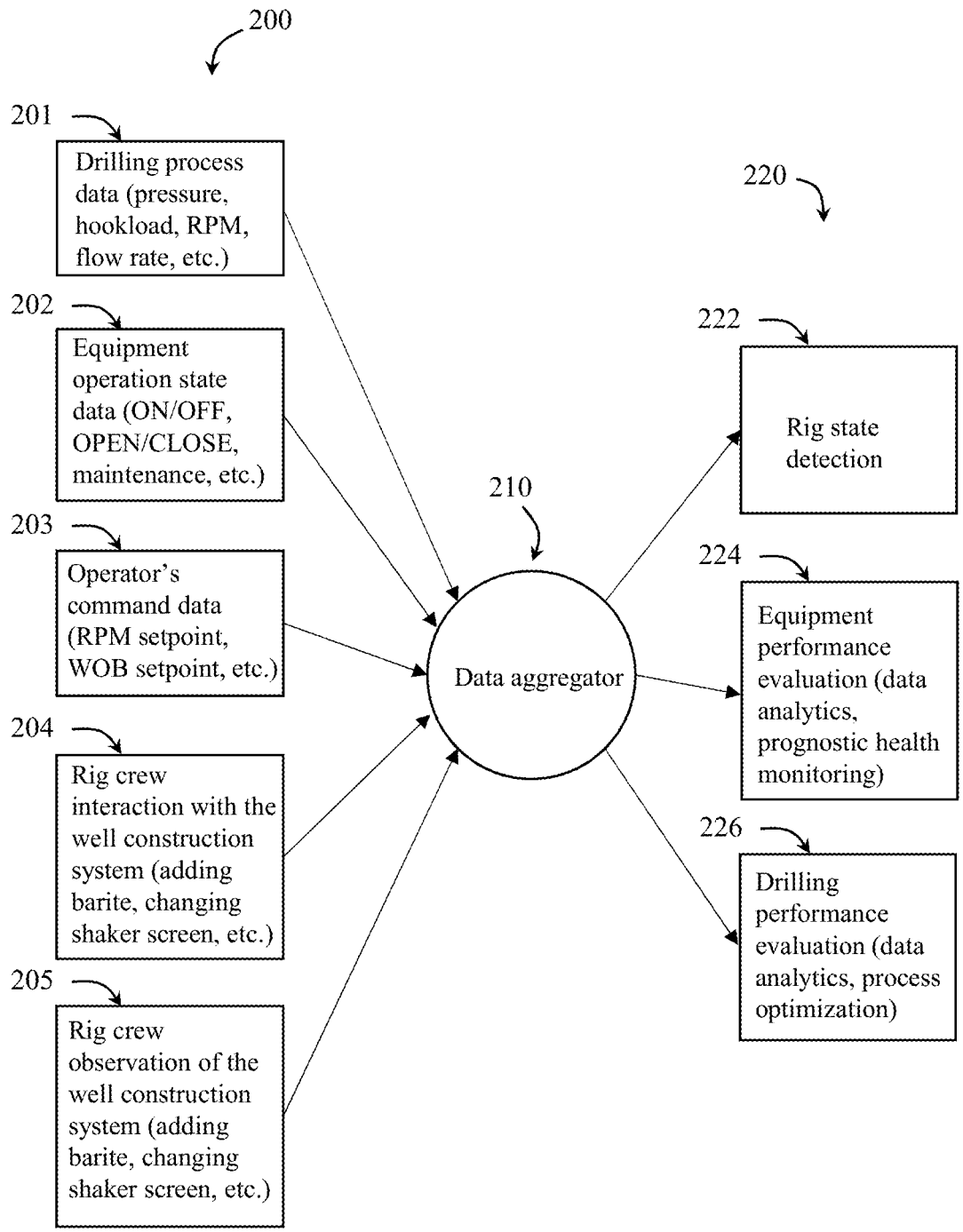
FIG. 2 shows a schematic representation of methods according to embodiments of the present disclosure.

For example, FIG. 2 shows a schematic representation of collected data 200 from a well construction system according to embodiments of the present disclosure, where the collected data 200 may be collected into a data aggregator 210 (e.g., a database). Collected data 200 may include collected data types discussed herein. For example, collected data 200 may include drilling process data 201 (e.g., pressure, hookload, RPM, flow rate, etc.), equipment operation state data 202 (e.g., on/off, open/closed, or maintenance status), operator command data 203 (e.g., RPM setpoint, WOB setpoint, etc.), rig crew interaction with the well construction system 204 (e.g., adding barite, changing a shaker screen, etc.), and rig crew observation of the well construction system 205 (e.g., adding a material to the well construction system, component failure, etc.).

Collected data 200 from the data aggregator 210 may be searched and/or sorted for use in an analysis application 220. An analysis application 220 may be a computer program having instructions for processing and analyzing data in order to determine a status of the well construction system and/or one or more components in the well construction system. For example, analysis applications 220 may include a rig state detection application 222 to determine the overall state of the rig (e.g., drilling state, tripping state, or reaming state, etc.), an equipment performance evaluation application 224 (which may include data analytics and/or prognostic health monitoring) to determine the performance of a selected equipment unit in a well construction system, and/or a drilling performance evaluation 226 (which may include data analytics and/or process optimization) to determine performance of a drilling operation, such as drilling depth progress, fluid use, and/or drilling efficiency.

Figure 3:
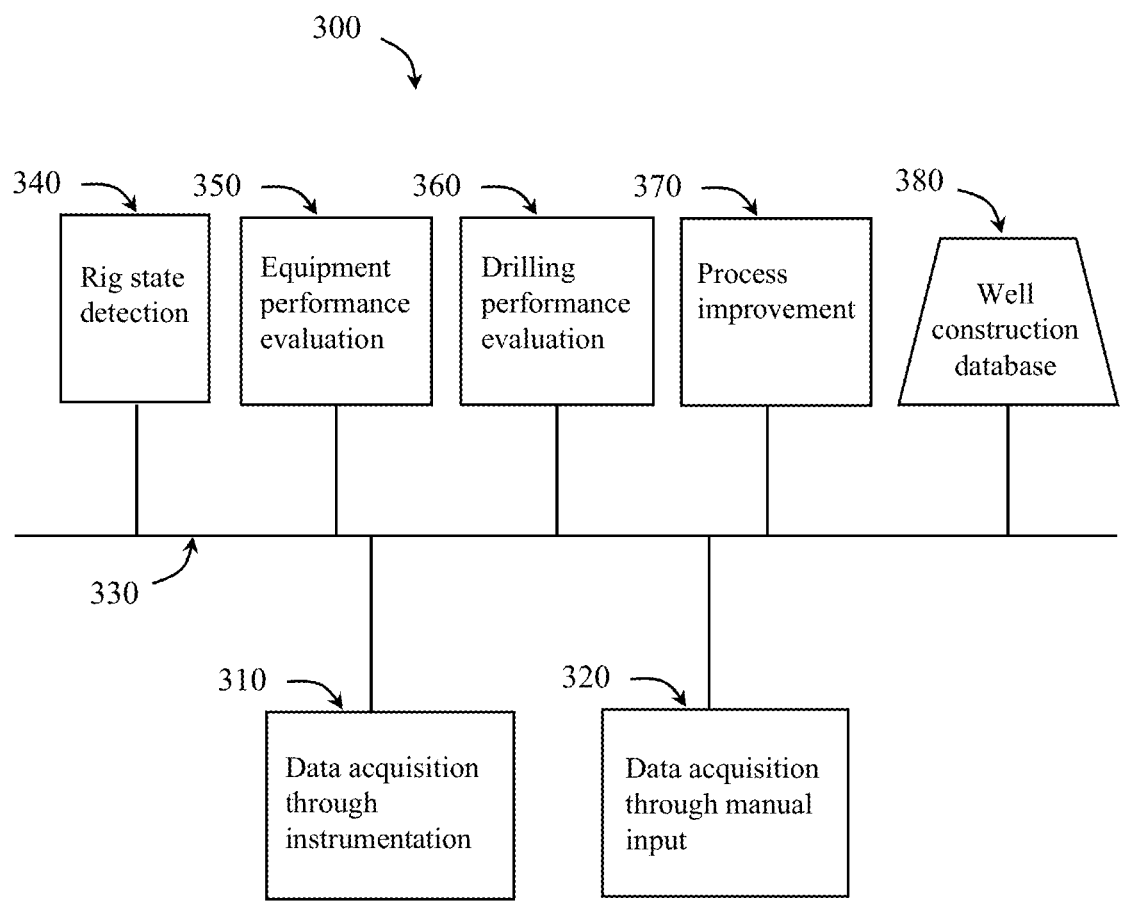
FIG. 3 shows a schematic representation of methods according to embodiments of the present disclosure.

FIG. 3 shows a schematic representation of another example of a data collection and analysis system 300 according to embodiments of the present disclosure. As shown, collected data may be acquired through instrumentation 310 (e.g., through sensors) and/or manually through user input 320. The collected data may be published into a databus 330 through a communication middleware, where the collected data may be received by any applications on the same databus 330. The applications may include, for example, a rig state estimation application 340, an equipment performance evaluation application 350, a drilling performance evaluation application 360, a process improvement application 370, and a well construction database 380.

Using Collected Data with Operation Context

According to embodiments of the present disclosure, evaluation of a well construction system (e.g., the state of the well construction system, the state and/or performance of equipment in the well construction system, and operation performance) may be performed relatively more easily, without complex mathematical analysis and estimation, by collecting data from the well construction system in its operational context. In other words, data may be collected and tagged (with data location and time, as discussed herein) from a well construction system that includes operational data (e.g., if a component is on/off, open/closed, etc.) in combination with other types of data in order to more quickly and easily analyze the well construction system or components thereof.

For example, if a query is made as to whether the drillstring is moving (i.e., whether the bit depth is changing), it would conventionally be difficult to determine without being on the well floor as the pipe (or drillstring) may not being moving even though the block and the top drive is moving. On the other hand, if pipe is connected with the top drive, determination of whether the top drive is moving could be done automatically (e.g., through use of sensors that measure the position change of the block). By using embodiments of the present disclosure, however, determination of whether the drillstring is moving may be conducted by analyzing data collected in terms of its operation context, as discussed herein. For example, collected data including video of the top drive/drillstring and instrumentational data indicating whether pipe is connected to the top drive may be used in combination with other instrumentation data to determine whether the drillstring is moving. In this example, the video of the top drive/drillstring may be digitally analyzed using a computer algorithm to tell if the top drive is connected to the drillstring, or a person may watch the video to tell if the top drive is connected to the drillstring. If top drive is connected to the drillstring, any movement of block (and top drive) is directly related to the movement of the drillstring, leading to corresponding bit depth change; if top drive is not connected to the drillstring, any movement of block (and top drive) would not lead to movement of the drillstring, leading to no bit depth change.

Further, by time stamping the collected data of the present disclosure with reference to a single master clock reference, the collected data may be searched and analyzed to determine state or performance at a given time during the well construction system operation.

According to embodiments of the present disclosure, rig state estimation (or other well construction system state estimation) may be performed using collected data with a rig state estimation application, which may include, for example, a computer program having instructions to search a database of stored collected data for collected data tagged from a selected location and time to analyze selected conditions in response to a query on the state of the rig system. With collected data including operational context, rig state may be estimated with improved accuracy through the use of collected data associated with operator command (intent), actuator state (drive state), and optionally a secondary validation (validation).

As an example, to determine whether the slip is in or out position, one could use the following two set of data: 1) the operator's command to set the slip in or out and 2) the state (or the position) of the actuator in the power slip. For in-slip or out of slip detection, a secondary validation data may be used to determine the rig state. For example, secondary validation data may be collected from a sensor measuring the weight of drill string on the slip, which may confirm whether the slip is engaged with the drill string. Thus, an in-slip status may be satisfied with the following conditions: (a) the operator sets the in-slip command; (b) the power slip actuator extends; and (c) the weight of the drill string is transferred to the slip. An out of slip status may be satisfied with the following conditions: (a) the operator sets the out-of-slip command; (b) the power slip actuator retracts; and (c) the weight of the drill string is transferred to the hoisting system. Any other conditions may indicate that the system is at fault, or at an uncertain state.

As another example, methods of the present disclosure for rig state estimation may include estimation of a rotating state. One could use the following two set of data: 1) the operator's command to start rotation (e.g., on the top drive, or the rotary table) and an RPM set point, and 2) the current that goes through the drive mechanism (e.g., obtained by collecting sensor data from a current sensor). A secondary validation data to measure the actual RPM may be used to ascertain the state of rotation. The state of a pump, drawwork (block movement), or other rig equipment can be estimated in a similar manner.

According to embodiments of the present disclosure, equipment performance evaluation may be performed using collected data with an equipment performance evaluation application, which may include, for example, a computer program having instructions to search a database of stored collected data for collected data tagged from a selected location and time to analyze performance of a selected equipment unit in response to a query.

In some embodiments, the acquisition of personnel (e.g., rig crew) observation data may fill a gap for proper equipment performance evaluation. In most condition based equipment health monitoring, equipment data is relatively easy to collect, as one only needs to install enough sensors to measure the intended parameters. However, until now, there has been a lack of information regarding the actual equipment condition, such as when an equipment unit breaks down, whether a maintenance service is being performed, or whether a part is being replaced. The inclusion of personnel observation data provides this missing information in order to improve analysis of the performance of the equipment.

According to embodiments of the present disclosure, drilling performance evaluation may be performed using collected data with a drilling performance evaluation application, which may include, for example, a computer program having instructions to search a database of stored collected data for collected data tagged from a selected location and time to analyze drilling performance.

Figure 4:
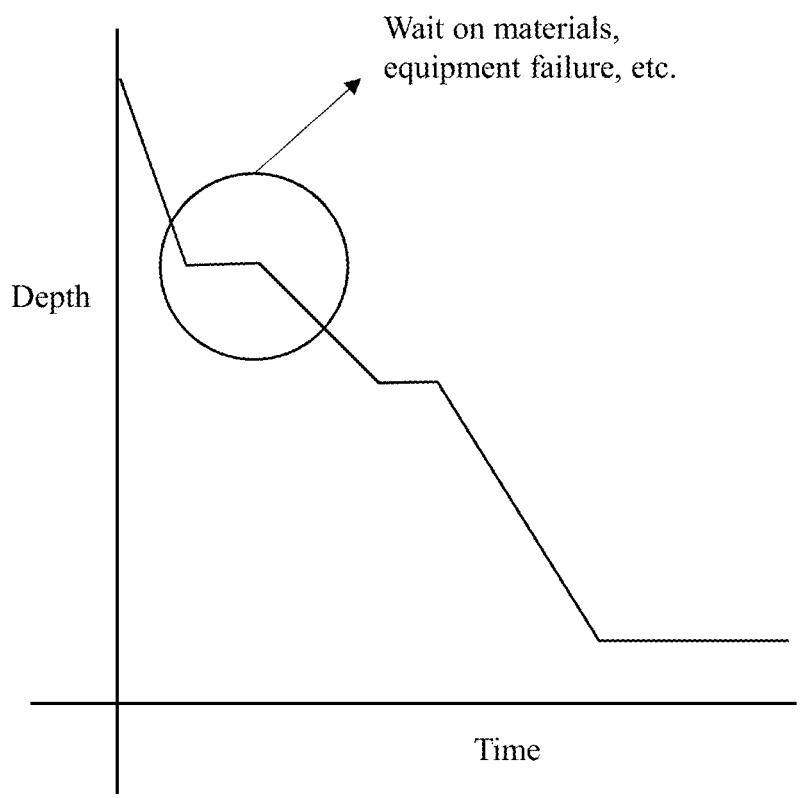
FIG. 4 shows an analysis of a drilling performance graph according to embodiments of the present disclosure.

Conventionally used methods of evaluating drilling performance is often through use of a time vs. depth curve, as shown in FIG. 4. This curve may capture the flat time, as well as the overall drilling efficiency (how fast the well was drilled). However, it typically lacks adequate details to tell the operator what caused the flat time. By collecting data with operation context, great insight can be gained by looking at operation during flat time. For example, by zooming in the collected data at the interval of the flat time in FIG. 4, the reason for the flat time may be more easily determined. For example, collected data at an interval of the flat time may indicate the cause of the flat as either due to equipment failure, or logistic interruption. Using this process, actions within the drilling operation may be taken to reduce flat time accordingly.

According to some embodiments of the present disclosure, process improvement analysis may be performed using collected data with a process improvement application, which may include, for example, a computer program having instructions to search a database of stored collected data for collected data tagged from a selected location and time to analyze process performance and causes of inefficiencies.

Analysis of what actually takes place during well construction system events, both routine and exceptional, using instrumentation data and state and observational data, and comparing with what should happen, may allow for identification of potential process improvements. Potential process improvements may be determined, for example, by identification of where planned actions or timings are difficult or unachievable due to physical constraints, where improved operator training may be needed, as well as where changes in equipment, procedure, or human operations may be made for improving the planned process during drilling the well.

Methods of the present disclosure may include collecting and storing data related to a well construction system in a database. A well construction database may capture all well construction system data as acquired through sensors and manual input. The collected data may be made available for any applications for data mining purposes. For example, the applications described above (e.g., well construction system state estimation, equipment performance evaluation and drilling performance evaluation) may directly access collected data through the well construction system database. In accessing the well construction system database for use in an evaluation application, the well construction system database may be searched for collected data tagged as related to a selected component in the well construction system.

In some embodiments, well construction system data may be collected into a data bus rather than a database. In such embodiments, evaluation applications such as described above may access the collected data through the data bus to perform analysis of the application.

According to embodiments of the present disclosure, methods of evaluating a well construction system may include constructing a digital description of the well construction system, the digital description including a list of components in the well construction system and a plurality of locational relationships between components in the well construction system, collecting multiple types of data from the well construction system by automatically collecting data through instrumentation and manually inputting data, and determining an operational state of at least one component in the well construction system based on the collected data. The operational state of a component may be determined based at least partially on instrumentation data. Determination of operation state may be further enhanced by using manually collected data. In some embodiments, the digital description may further include a list of subsystems in the well construction system, relationships between components in each subsystem, and relationships between subsystems in the well construction system.

According to some embodiments of the present disclosure, methods of evaluating a well construction system may include collecting into a database sensor data from one or more sensors disposed along the well construction system, inputting into the database non-sensor data, which may include at least one of operational state data indicating an on/off status of one or more components in the well construction system, operator commands, observational inputs, and interactions between personnel and the well construction system, tagging the sensor data and the non-sensor data with an identification indicating a component in the well construction system from which the data is collected, and comparing sensor data identified from a selected component in the well construction system with non-sensor data identified from the selected component to determine an operational state or performance of the selected component. For example, a selected component may be a rotating component, wherein determining the operational state of the selected component may include comparing sensor data of current readings from a drive mechanism of the rotating component with non-sensor data of an operator command to operate the rotating component.

Systems according to embodiments of the present disclosure may include a well construction system (e.g., a rig system, such as shown in FIG. 1), a digital description of the well construction system (e.g., including a list of components in the well construction system and a plurality of locational, and/or logical relationships between components in the well construction system), and a database, or other storage types for storing sensor data collected from a plurality of sensor disposed in the well construction system and non-sensor data selected from at least one of operational state data indicating an on/off status of one or more of the components in the well construction system, operator commands, observational inputs, and interactions between personnel and the well construction system. Transmission of the instrumentation data, and/or manually input data may be accomplished through the use of a common communication databus. The common communication databus may enable real time analytics, such as rig state detection, equipment performance evaluation, drilling performance evaluation and process improvement. The communication databus may further enable delivery of the instrumentation data and manually input data to the well construction database, as shown in FIG. 3. The well construction database may allow offline, or post-job analytics for rig state detection, equipment performance evaluation, drilling performance evaluation and process improvement. In some embodiments, stored collected data may also include video of the well construction system.

The digital description of the well construction system, communication vehicle (e.g. "databus") and the storage vehicle for collected well construction device (e.g., a database) may be provided on a computing device or over a computing network. In some embodiments, a computing device may include a processor and a computer readable medium for executing software instructions on the processor, where the software instructions may include instructions to access and search the database.

Figure 5:
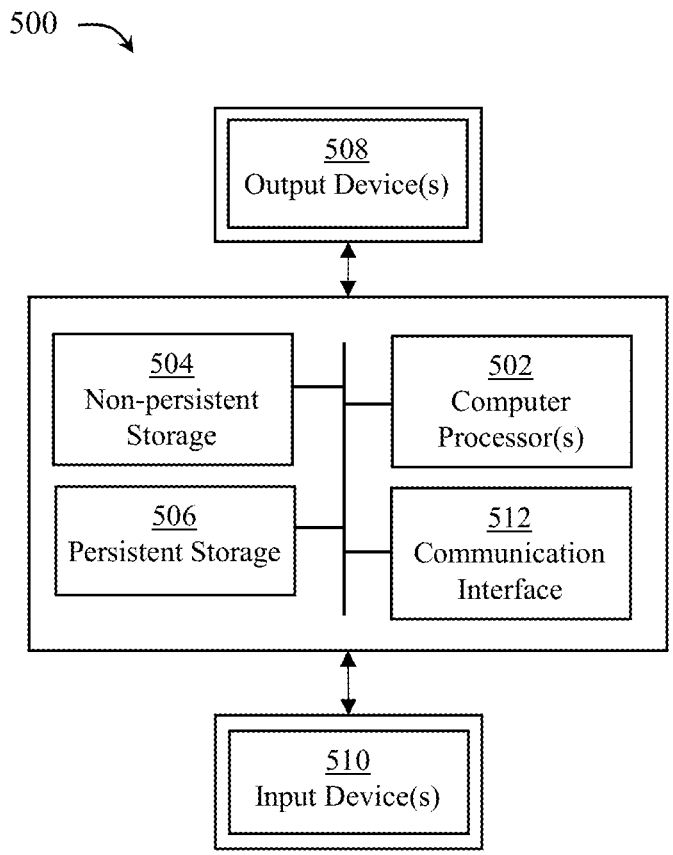
FIGS. 5 and 6 show a computing system in accordance with embodiments of the present disclosure.

Embodiments may be implemented on a computing system. Any combination of mobile, desktop, server, router, switch, embedded device, or other types of hardware may be used. For example, as shown in FIG. 5, a computing system 500 may include one or more computer processors 502, non-persistent storage 504 (e.g., volatile memory, such as random access memory (RAM), cache memory), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), and numerous other elements and functionalities.

The computer processor(s) 502 may be an integrated circuit for processing instructions. For example, the computer processor(s) may be one or more cores or micro-cores of a processor. The computing system 500 may also include one or more input devices 510, such as a touchscreen, keyboard, mouse, microphone, touchpad, electronic pen, or any other type of input device.

The communication interface 512 may include an integrated circuit for connecting the computing system 500 to a network (not shown) (e.g., a local area network (LAN), a wide area network (WAN) such as the Internet, mobile network, or any other type of network) and/or to another device, such as another computing device.

Further, the computing system 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 6:
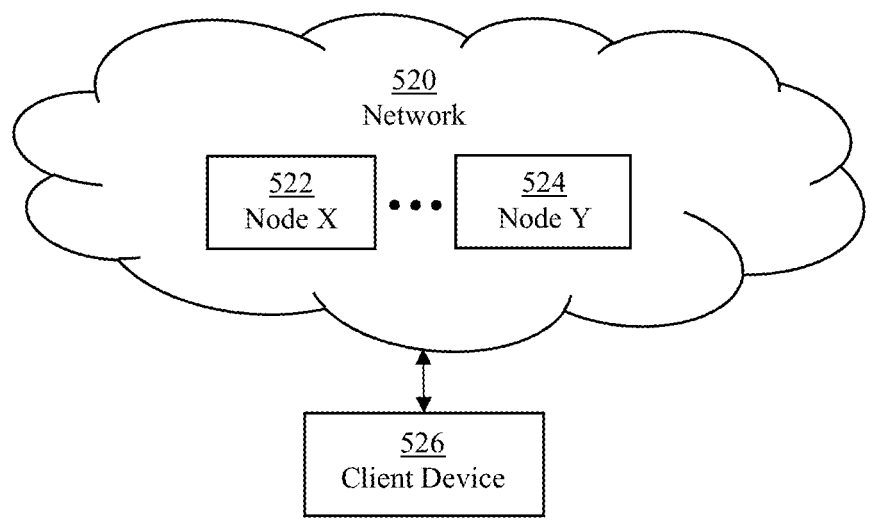

The computing system 500 in FIG. 5 may be connected to or be a part of a network. For example, as shown in FIG. 6, the network 520 may include multiple nodes (e.g., node X 522, node Y 524). Each node may correspond to a computing system, such as the computing system shown in FIG. 5, or a group of nodes combined may correspond to the computing system shown in FIG. 5. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 500 may be located at a remote location and connected to the other elements over a network.

The computing system in FIG. 5 may implement and/or be connected to a data repository. For example, one type of data repository is a database, such as described above. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5 and the nodes and/or client device in FIG. 6. Other functions may be performed using one or more embodiments of the disclosure.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method, comprising:
   receiving a digital description of a well construction system, wherein the digital description of the well construction system describes a locational relationship of components in the well construction system;
   collecting multiple types of data from a well construction system, the multiple types of data comprising:
      sensor data collected from sensors disposed along the well construction system, wherein each of the sensors comprises a corresponding component location and wherein the sensors comprise at least one downhole sensor coupled to a drillstring that comprises a drill bit; and
      non-sensor data, wherein the non-sensor data comprises operational data of an automated control system that controls one or more of the components, wherein each of the one or more components comprises a corresponding component location;
   tagging the collected sensor data and the collected non-sensor data with an identification indicating a clock reference time and the corresponding component location;
   searching the tagged collected sensor data and the tagged collected non-sensor data based at least in part on time and location using a process improvement application to generate search results; and
   determining an operational state of at least one of the components using at least a portion of the search results to implement a process improvement for the well construction system, wherein the search results indicate bit depth based on block position of a traveling block of a rig, dependent on whether the drillstring is operatively coupled to the traveling block, and wherein the process improvement acts to reduce flat time in drilling depth versus time.

2. The method of claim 1, wherein the locational relationship includes relative spatial and/or logical relationship of the components in the well construction system.

3. The method of claim 1, wherein the collected data are collected from multiple component types in the well construction system.

4. The method of claim 1, wherein the multiple types of data further comprises video of the well construction system.

5. The method of claim 1, wherein the multiple types of data further comprises operator inputs.

6. The method of claim 5, wherein the operator inputs comprise data inputs describing physical interaction of rig personnel with the components in the well construction system.

7. The method of claim 5, wherein the operator inputs comprise data inputs describing the operator's observation of the equipment state and/or well construction operation state.

8. The method of claim 1, further comprising evaluating at least one of a state of a rig in the well construction system, equipment performance and drilling performance based on the collected data.

9. The method of claim 1, wherein the digital description further comprises a list of subsystems in the well construction system, relationships between components in each subsystem, and relationships between subsystems in the well construction system.

10. The method of claim 1, wherein the collected data comprise video of the well construction system, the method further comprising:
    using a computer program to detect and identify changes in the video;
    wherein the operational state of the at least one of the components is determined based at least in part on the identified changes in the video.

11. The method of claim 1, wherein the operational state of the at least one of the components is determined based at least in part on manually input data.

12. The method of claim 1, wherein the collected data are collected into a databus.

13. The method of claim 1, wherein the at least one of the components is a rotating component, and wherein determining the operational state comprises comparing a portion of the tagged sensor data comprising current readings from a drive mechanism of the rotating component with a portion of the tagged non-sensor data comprising an operator command to operate the rotating component.

14. The method of claim 1, wherein the operational state of at least one of the components corresponds to an operational state of one of the sensors.

15. The method of claim 1, comprising issuing a signal to implement the process improvement for the well construction system.

16. The method of claim 15, wherein the signal calls for servicing at least one of the sensors.

17. The method of claim 1, wherein the search results comprise search results for a flat time that indicate a cause of the flat time.

18. The method of claim 17, wherein the cause of the flat time is due to equipment failure or logistic interruption.

19. The method of claim 17, wherein the cause of the flat time is due to logistic interruption.

20. A system comprising:
a computing device comprising a processor; and
a non-transitory computer readable medium for executing software instructions on the processor, the software instructions comprising instructions to:
receive a digital description of a well construction system, wherein the digital description of the well construction system describes a locational relationship of components in the well construction system;
collect multiple types of data from a well construction system, the multiple types of data comprising sensor data collected from sensors disposed along the well construction system, wherein each of the sensors comprises a corresponding component location and wherein the sensors comprise at least one downhole sensor coupled to a drillstring that comprises a drill bit, and non-sensor data, wherein the non-sensor data comprises operational data of an automated control system that controls one or more of the components, wherein each of the one or more components comprises a corresponding component location;
tag the collected sensor data and the collected non-sensor data with an identification indicating a clock reference time and the corresponding component;
search the tagged collected sensor data and the tagged collected non-sensor data based at least in part on time and location using a process improvement application to generate search results; and
determine an operational state of at least one of the components using at least a portion of the search results to implement a process improvement for the well construction system, wherein the search results indicate bit depth based on block position of a traveling block of a rig, dependent on whether the drillstring is operatively coupled to the traveling block, and wherein the process improvement acts to reduce flat time in drilling depth versus time.

* * * * *